US011996220B2

(12) United States Patent
Yasuhara et al.

(10) Patent No.: US 11,996,220 B2
(45) Date of Patent: May 28, 2024

(54) SOFT MAGNETIC ALLOY POWDER, DUST CORE, AND COIL COMPONENT

(71) Applicant: TDK CORPORATION, Tokyo (JP)

(72) Inventors: Katsushi Yasuhara, Tokyo (JP); Ryoma Nakazawa, Tokyo (JP); Yusuke Taniguchi, Tokyo (JP); Hiroyuki Ono, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/879,862

(22) Filed: Aug. 3, 2022

(65) Prior Publication Data

US 2023/0047154 A1 Feb. 16, 2023

(30) Foreign Application Priority Data

Aug. 6, 2021 (JP) ................................ 2021-130101
Jun. 27, 2022 (JP) ................................ 2022-102850

(51) Int. Cl.

| | |
|---|---|
| ***H01F 1/147*** | (2006.01) |
| ***B22F 1/052*** | (2022.01) |
| ***C22C 38/02*** | (2006.01) |
| ***H01F 1/20*** | (2006.01) |
| ***H01F 3/08*** | (2006.01) |
| ***H01F 5/00*** | (2006.01) |
| ***H01F 27/255*** | (2006.01) |
| ***H01F 27/28*** | (2006.01) |

(52) U.S. Cl.

CPC .......... *H01F 1/14766* (2013.01); *B22F 1/052* (2022.01); *C22C 38/02* (2013.01); *H01F 1/20* (2013.01); *H01F 3/08* (2013.01); *H01F 5/00* (2013.01); *H01F 27/255* (2013.01); *H01F 27/28* (2013.01); *C22C 2202/02* (2013.01)

(58) Field of Classification Search

CPC .......... H01F 1/14766; H01F 1/20; H01F 5/00; H01F 27/255; H01F 27/28; C22C 38/02; C22C 2202/02; B22F 1/052

See application file for complete search history.

(56) References Cited

U.S. PATENT DOCUMENTS

2022/0005636 A1 1/2022 Kawauchi et al.

FOREIGN PATENT DOCUMENTS

| | | | |
|---|---|---|---|
| JP | 2016-143700 A | | 8/2016 |
| JP | 2018-206835 A | | 12/2018 |
| JP | 2018-206836 A | | 12/2018 |
| JP | 2018206835 A | * | 12/2018 |
| JP | 2020-094272 A | | 6/2020 |
| KR | 10-2021-0083245 A | | 7/2021 |

OTHER PUBLICATIONS

JP-2018206835-A: Espacenet English machine translation (Year: 2018).*

* cited by examiner

*Primary Examiner* — Adil A. Siddiqui
(74) *Attorney, Agent, or Firm* — Oliff PLC

(57) ABSTRACT

A soft magnetic alloy powder contains soft magnetic alloy particles. The soft magnetic alloy particles contain Fe and Si. The soft magnetic alloy particles each include crystal grains and crystal grain boundary between the crystal grains. At least one of the crystal grains has a Si segregation part.

20 Claims, 10 Drawing Sheets

SOFT MAGNETIC ALLOY POWDER, DUST CORE, AND COIL COMPONENT

This application claims priority to Japanese patent application No. 2021-130101 filed on Aug. 6, 2021, and Japanese patent application No. 2022-102850 filed on Jun. 27, 2022, each of which is incorporated herein by reference in its entirety.

BACKGROUND

The present disclosure relates to a soft magnetic alloy powder, a dust core, and a coil component.

Patent Document 1 describes an invention of a metal magnetic material containing soft magnetic alloy particles composed of Fe and Si. The metal magnetic material includes a layer containing Si at a high concentration between the soft magnetic alloy particles.

Patent Document 2 describes an invention of soft magnetic alloy particles containing Fe and Ni. The soft magnetic alloy particles include crystal grains and a crystal grain boundary between the crystal grains, and the crystal grain boundary has a high-resistance layer.

[Patent Document 1] Japanese Patent Laid-Open No. 2016-143700

[Patent Document 2] Japanese Patent Laid-Open No. 2018-206835

SUMMARY

A soft magnetic alloy powder of an embodiment of the present disclosure is a soft magnetic alloy powder containing soft magnetic alloy particles, wherein the soft magnetic alloy particles contain Fe and Si, the soft magnetic alloy particles include crystal grains and a crystal grain boundary between the crystal grains, and at least one of the crystal grains has a Si segregation part.

DETAILED DESCRIPTION

Figure 1:
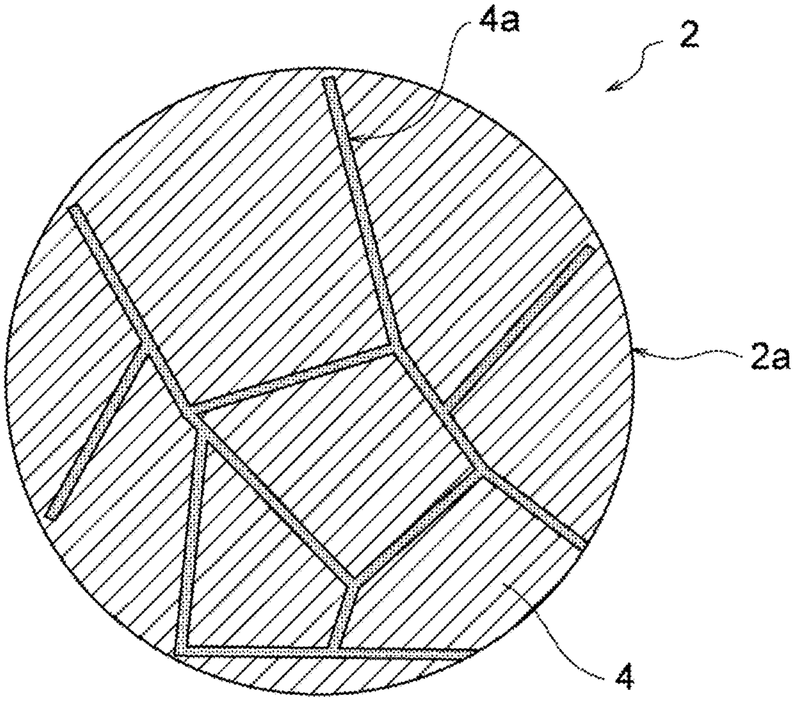
FIG. 1 is a schematic view of soft magnetic alloy particles according to one example embodiment.

Hereinafter, an embodiment of the present disclosure will be described with reference to the drawings, but the embodiment of the present disclosure is not limited to the following embodiments. Further, elements in the following example embodiments which are not recited in a most-generic independent claim of the disclosure are optional and may be provided on an as-needed basis. The drawings are schematic and are not intended to be drawn to scale. Like elements are denoted with the same reference numerals to avoid redundant descriptions.

A soft magnetic alloy powder of the present embodiment contains soft magnetic alloy particles 2. As shown in FIG. 1, the soft magnetic alloy particles 2 include crystal grains 4 and a crystal grain boundary **4*a* present between the crystal grains 4**.

The soft magnetic alloy particles 2 contained in the soft magnetic alloy powder of the present embodiment are characterized in that at least one of the crystal grains 4 has a Si segregation part. The Si segregation part is a part with high concentration of Si.

The Si segregation part is a part considered to have higher electrical resistance than parts other than the Si segregation part of the crystal grains 4. Since the Si segregation part is included in the crystal grains 4, the electrical resistance in the crystal grain 4 is increased. Since the electrical resistance of the crystal grain 4 is increased, generation of an eddy current in the crystal grain 4 is suppressed. As a result, a dust core produced using the soft magnetic alloy powder containing the soft magnetic alloy particles 2 having at least one of the crystal grains 4 which has Si segregation part has good permeability particularly at a high frequency and has a low core loss. In particular, when a crystal grain size of the crystal grain 4 is large, an effect of suppressing the generation of the eddy current due to crystal grain 4 having the Si segregation part is increased.

Further, the crystal grain boundaries **4*a* may have the Si segregation part. Since the Si segregation parts are included in the crystal grain boundaries 4*a*, it is considered that electrical resistance at the crystal grain boundaries 4*a* is increased. Since the electrical resistance at the crystal grain boundaries 4*a* is increased, generation of an eddy current in the soft magnetic alloy particles 2** is suppressed.

Both the crystal grains 4 and the crystal grain boundaries **4*a* may have the Si segregation parts. A dust core produced using the soft magnetic alloy powder containing the soft magnetic alloy particles 2 having both at least one of the crystal grains 4 which has Si segregation part and at least one of the crystal grain boundaries 4*a*** which has Si segregation part has good permeability particularly at a high frequency and a low core loss.

An average particle size of the soft magnetic alloy particles 2 is not particularly limited. However, for example, it is 1 μm or more and 50 μm or less. An average crystal grain size of the crystal grains 4 is not particularly limited. However, for example, it is 0.5 μm or more and 20 μm or less.

The soft magnetic alloy particles 2 contain at least Fe and Si. Other elements may be contained as long as the elements do not significantly affect characteristics of the soft magnetic alloy powder or the like containing the soft magnetic alloy particles 2. For example, each of the other elements may be contained in an amount of 5.0 mass % or less, or may be contained in an amount of 1.0 mass % or less. Further, the other elements may be contained in a total amount of 10.0 mass % or less, or may be contained in a total amount of 2.0 mass % or less.

However, when the soft magnetic alloy particles 2 contain Ni, the crystal grains 4 are less likely to contain the Si segregation parts. Further, a raw material containing Ni is expensive. Therefore, Ni may be contained in an amount of 5.0 mass % or less, or may be contained in an amount of 0.5 mass % or less.

The soft magnetic alloy particles 2 may contain only Fe, Si, and inevitable impurities. In this case, the inevitable impurities may be contained in a total amount of 2.0 mass % or less, or may be contained in a total amount of 1.0 mass % or less.

An amount of Si in the soft magnetic alloy particles 2 is not particularly limited. It may be 2.0 mass % or more and 12.0 mass % or less, and may be 3.0 mass % or more and 11.0 mass % or less. When the amount of Si is 2.0 mass % or more or 3.0 mass % or more, coercivity of the soft magnetic alloy powder containing the soft magnetic alloy particles 2 is easily reduced. Further, a core loss of the dust core containing the soft magnetic alloy powder is easily reduced. When the amount of Si is 12.0 mass % or less or 11.0 mass % or less, saturation magnetization of the soft magnetic alloy powder containing the soft magnetic alloy particles 2 is easily increased. Further, permeability and DC superimposition characteristics of the dust core containing the soft magnetic alloy powder is easily improved.

Figure 2:
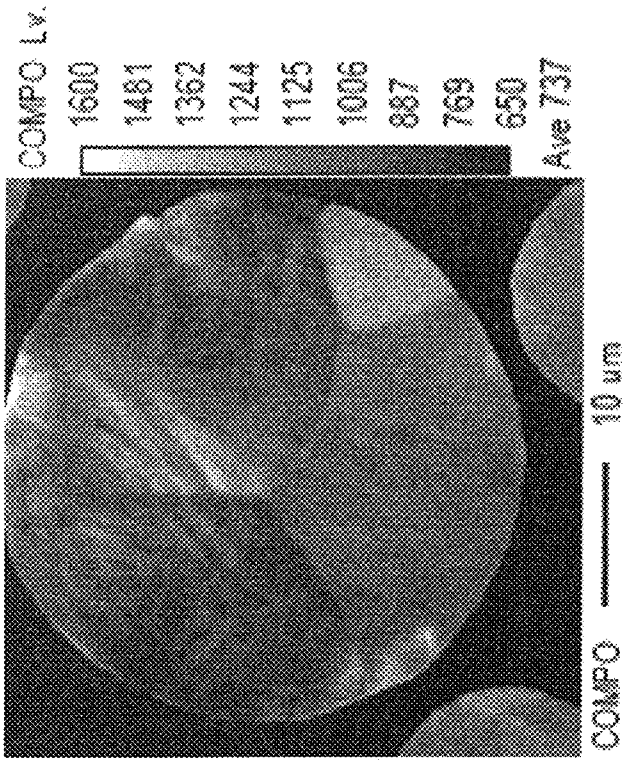
FIG. 2 is a COMPO image of soft magnetic alloy particles of Sample No. 3.

It can be confirmed that the soft magnetic alloy particles 2 include the crystal grains 4 and the crystal grain boundaries 4*a* present between the crystal grains 4 by observing a backscattered electron image (COMPO image) obtained using EPMA. FIG. 2 shows a COMPO image of the soft magnetic alloy particles according to the present embodiment. A magnification of the COMPO image is not particularly limited. A magnification and a resolution of the COMPO image may be sufficient to confirm a fine structure of the soft magnetic alloy particles described above. The magnification of the COMPO image may be, for example, 500 times or more and 5000 times or less.

Figure 3:
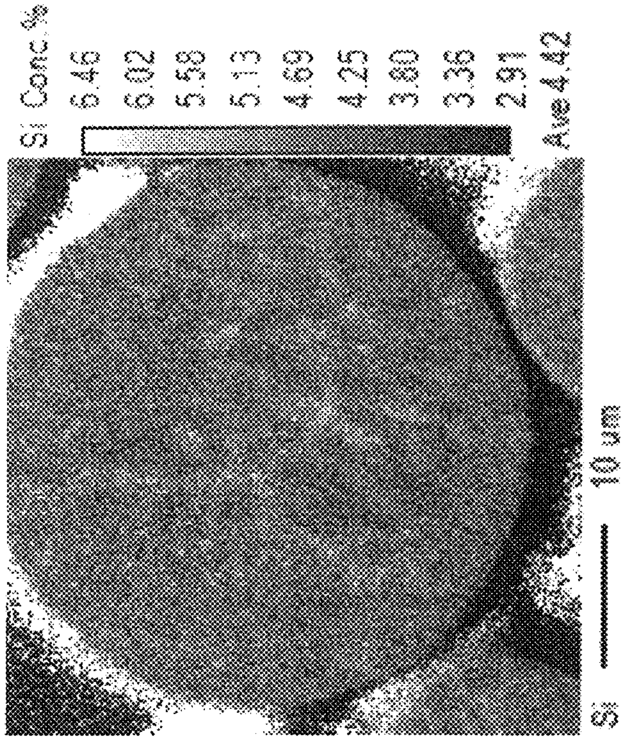
FIG. 3 is a Si mapping image of the soft magnetic alloy particles of Sample No. 3.

Further, it is confirmed that at least one of the crystal grain boundaries 4*a* and/or at least one of the crystal grains 4 have the Si segregation parts by performing Si mapping using EPMA. A Si mapping image of the soft magnetic alloy particles shown in FIG. 2 is shown in FIG. 3. In the present disclosure, a part having a Si concentration of 105% or more with respect to an average Si concentration of the soft magnetic alloy particles is referred to as a Si segregation part. A size of one Si segregation part is 0.4 $\mu m^2$ or more. A part having a size of less than 0.4 $\mu m^2$ is not regarded as a Si segregation part.

Figure 4:
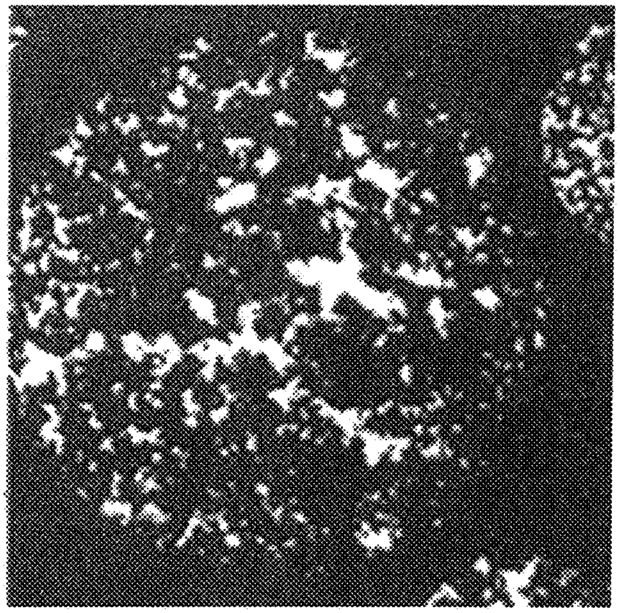
FIG. 4 is an image obtained by binarizing FIG. 3.

FIG. 4 shows an image obtained by binarizing the Si mapping image shown in FIG. 3 with the part having a Si concentration of 105% or more and a part having a Si concentration of less than 105% with respect to the average Si concentration of the soft magnetic alloy particles. By comparing FIG. 2 and FIG. 4, it is possible to confirm whether the Si segregation part is present in the crystal grain boundary and whether the Si segregation part is present in the crystal grain. As shown in FIGS. 3 and 4, the Si segregation part is present in the crystal grain boundary, and the Si segregation part is present in a net-like structure in the crystal grain.

Figure 5:
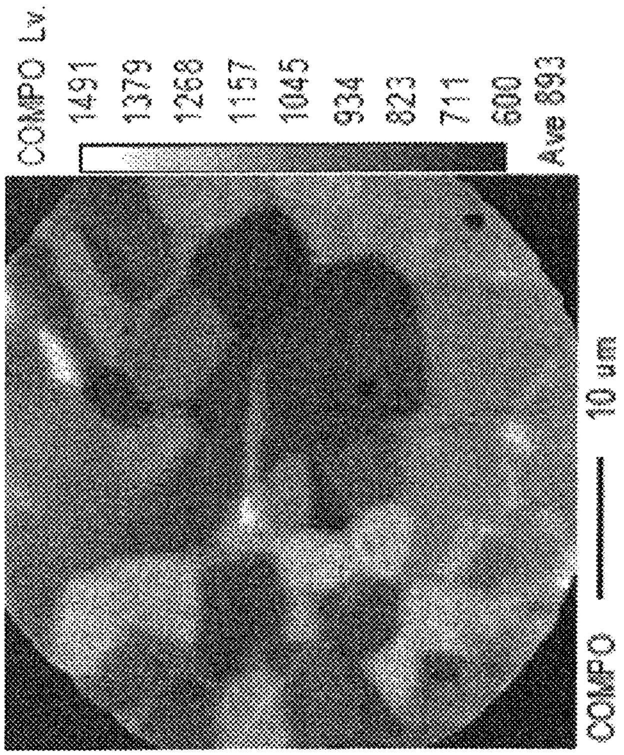
FIG. 5 is a COMPO image of soft magnetic alloy particles of Sample No. 6.
Figure 6:
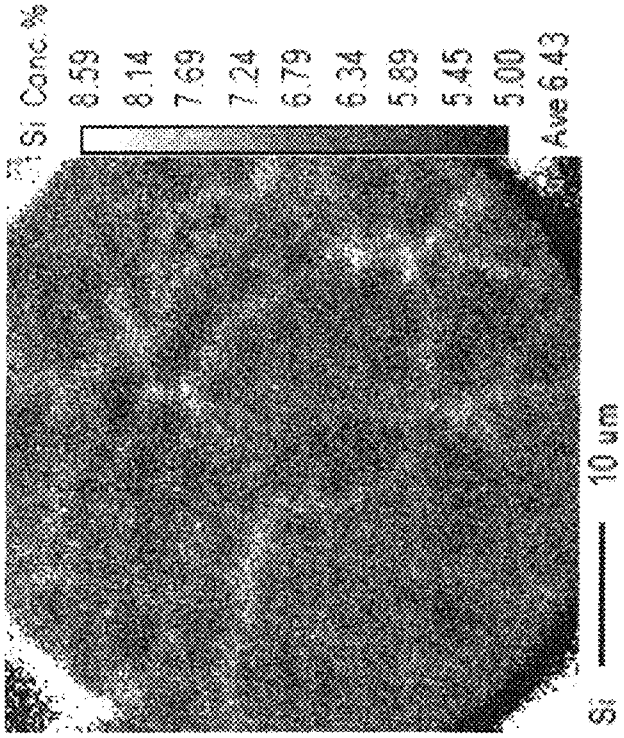
FIG. 6 is a Si mapping image of the soft magnetic alloy particles of Sample No. 6.
Figure 7:
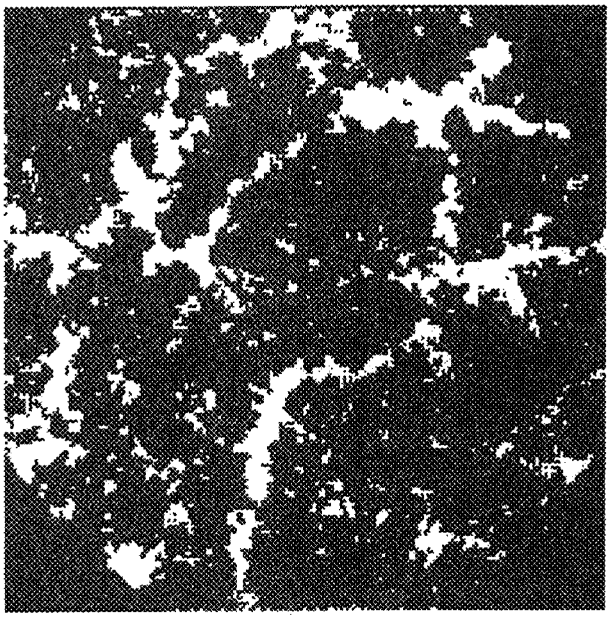
FIG. 7 is an image obtained by binarizing FIG. 6.
Figure 8:
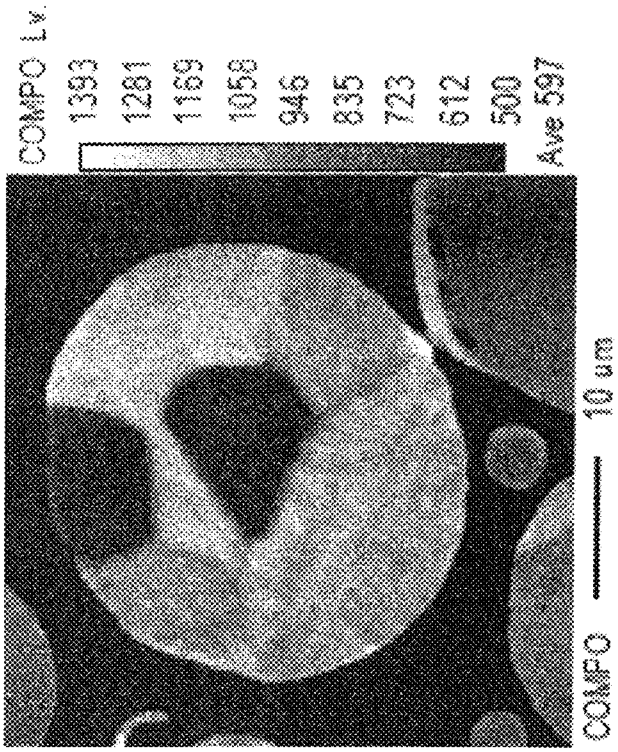
FIG. 8 is a COMPO image of soft magnetic alloy particles of Sample No. 7.
Figure 9:
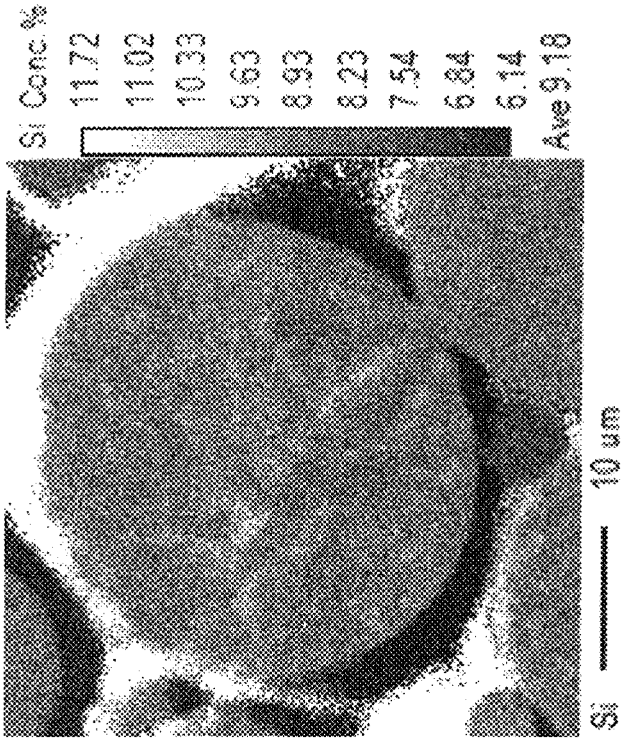
FIG. 9 is a Si mapping image of the soft magnetic alloy particles of Sample No. 7.
Figure 10:
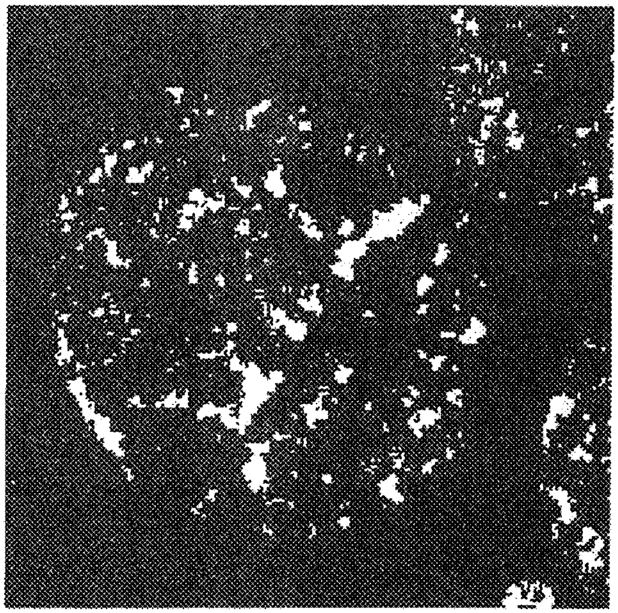
FIG. 10 is an image obtained by binarizing FIG. 9.

FIGS. 2 to 4 show soft magnetic alloy particles in which an amount of Si is 4.5 mass %. The soft magnetic alloy particles shown in FIGS. 2 to 4 are soft magnetic alloy particles of Sample No. 3 to be described later. FIGS. 5 to 7 and FIGS. 8 to 10 also show a COMPO image, a Si mapping image, and an image obtained by binarizing the Si mapping image of the soft magnetic alloy particles, respectively. The soft magnetic alloy particles shown in FIGS. 5 to 7 are soft magnetic alloy particles of Sample No. 6 (an amount of Si is 6.5 mass %) to be described later. The soft magnetic alloy particles shown in FIGS. 8 to 10 are soft magnetic alloy particles of Sample No. 7 (an amount of Si is 8.0 mass %) to be described later.

An existence ratio of the Si segregation parts in the crystal grain boundaries 4*a* is not particularly limited. In a cross section of the soft magnetic alloy particles 2, a total area of the Si segregation parts in the crystal grain boundaries 4*a* may be 70% or more of the total area of the crystal grain boundaries 4*a*.

An existence ratio of the Si segregation parts in the crystal grains 4 is not particularly limited. In the cross section of the soft magnetic alloy particles 2, a total area of the Si segregation parts in the crystal grains 4 may be 5% or more of the total area of the crystal grains 4.

An oxide layer may be present on each of particle surfaces 2*a* of the soft magnetic alloy particles 2. For example, a thickness of the oxide layer may be 5.0 nm or less, or may be 3.0 nm or less. As the oxide layer is thinner, hardness of the soft magnetic alloy particles 2 is easily decreased, and workability is easily improved. Since the workability of the soft magnetic alloy particles 2 is improved, a density of the dust core containing the soft magnetic alloy particles 2 is easily improved.

The soft magnetic alloy powder according to the present embodiment contains the soft magnetic alloy particles 2 according to the present embodiment. The soft magnetic alloy powder according to the present embodiment does not need to consist of only the soft magnetic alloy particles 2 according to the present embodiment, and may contain soft magnetic alloy particles not including the Si segregation parts in the crystal grains. In the soft magnetic alloy powder according to the present embodiment, a content ratio of the soft magnetic alloy particles including the Si segregation parts in the crystal grains may be 50% or more based on the number of particles. Further, in the soft magnetic alloy powder according to the present embodiment, a content ratio of the soft magnetic alloy particles including the Si segregation parts in both the crystal grain boundaries and the crystal grains may be 50% or more based on the number of particles.

Hereinafter, an example of a method for manufacturing the soft magnetic alloy powder containing the soft magnetic alloy particles according to the present embodiment will be described, but the method for manufacturing the soft magnetic alloy powder according to the present embodiment is not limited to the following method. In the present disclosure, a powder is a substance containing plural particles.

First, a raw material of the soft magnetic alloy powder is prepared. The raw material to be prepared may be a simple substance such as a metal, or an alloy. A form of the raw material is not particularly limited. Examples thereof include an ingot, a chunk (lump), and a shot (particle).

Next, the prepared raw materials are weighed and mixed. At this time, the prepared raw materials are weighed so that a soft magnetic alloy powder having a target composition is finally obtained. Then, the mixed raw materials are melted and mixed to obtain a melt. A device used for melting and mixing is not particularly limited. For example, a crucible or the like is used.

Then, a soft magnetic alloy powder is manufactured from the melt. The method for manufacturing the soft magnetic alloy powder from the melt is not particularly limited. For example, a gas atomization method, a rotating disk atomization method, or a water atomization method can be used. Of these, in the gas atomization method, a soft magnetic alloy powder can be produced by supplying a melt as a continuous fluid with a nozzle or the like, and quenching the supplied melt by causing a high-pressure gas to collide with the melt.

Next, the obtained soft magnetic alloy powder is subjected to heat treatment. At this time, by performing the heat treatment under appropriate heat treatment conditions, Si segregation parts can be contained in the crystal grain boundaries and the crystal grains.

Heat treatment conditions vary depending on a composition of a target soft magnetic alloy powder. Usually, a holding temperature during the heat treatment may be 800° C. or more and 1100° C. or less, or 800° C. or more and 900° C. or less. A holding time may be 10 minutes or more and 3 hours or less, or 10 minutes or more and 2 hours or less.

Further, a cooling rate to 300° C. after the heat treatment may be 0.1° C./s or more and 100° C./s or less. A heat treatment atmosphere is not particularly limited. Usually, it may be an inert gas atmosphere such as nitrogen or argon, or a vacuum.

In particular, when the holding temperature during the heat treatment is a high temperature as described above and the cooling rate is a high rate as described above, the Si segregation parts can be contained not only in the crystal grain boundaries but also in the crystal grains. When the cooling rate is too low, the Si segregation parts are easily contained in the crystal grain boundaries, but the Si segregation parts are hardly contained in the crystal grains. When the cooling rate is too high, the Si segregation parts are hardly contained in both the crystal grain boundaries and the crystal grains. That is, when the cooling rate is too high, Si is likely to be uniformly contained in the soft magnetic alloy particles.

When the holding temperature is too high, the crystal grains tend to be coarse. When the holding temperature is too low, the Si segregation parts are easily contained in the crystal grain boundaries, but are hardly contained in the crystal grains.

The soft magnetic alloy powder containing the soft magnetic alloy particles according to the present embodiment may be obtained by the above method. A dust core may be obtained by a method normally used for the soft magnetic alloy powder according to the present embodiment. A method for obtaining the dust core is not particularly limited.

A dust core may be obtained using a soft magnetic alloy powder obtained by mixing the soft magnetic alloy powder according to the present embodiment with other soft magnetic metal powders. Types of the other soft magnetic metal powders are not particularly limited. For example, a soft magnetic metal powder having an average particle size smaller than that of the soft magnetic alloy powder according to the present embodiment may be used. The average particle size of the soft magnetic metal powder having a small average particle size may be 0.5 μm or more and 5 μm or less. A material of the soft magnetic metal powder having a small average particle size is not particularly limited. Examples thereof include metals such as pure iron and alloys such as permalloy.

When the soft magnetic alloy powder according to the present embodiment and the soft magnetic metal powder having a small average particle size are mixed, a ratio of the soft magnetic alloy powder according to the present embodiment is not particularly limited. For example, the ratio may be 50 mass % or more.

A coil component, for example, an inductor, a reactor, a motor, or the like can be obtained by a method commonly used for the dust core according to the present embodiment. In particular, a coil component having high saturation current, low coil resistance, high frequency, and low loss can be obtained. Further, when the dust core according to the present embodiment is used, it is easy to reduce a size of the coil component. A method for obtaining the coil component is not particularly limited.

EXAMPLES

Hereinafter, the present disclosure will be described in more detail with reference to examples and comparative examples, but the present disclosure is not limited to the following examples.

[Preparation of Soft Magnetic Alloy Powder]

First, ingots, chunks, or shots of simple substance Fe and simple substance Si were prepared. Next, the simple substance Fe and the simple substance Si were mixed to have an amount of Si shown in Tables 1 and 2, and a mixture thereof was entered in a crucible disposed in a gas atomization device. Next, in an inert atmosphere, the crucible was heated to 1500° C. or higher by high-frequency induction using a work coil provided outside the crucible, and the ingots, the chunks, or the shots in the crucible were melted and mixed to obtain a melt.

Next, the melt in the crucible was supplied from a nozzle provided in the crucible, and at the same time, a gas of 1 to 10 MPa was caused to collide with the supplied melt to quench the melt, thereby manufacturing Fe—Si based soft magnetic alloy powders having the amount of Si shown in Tables 1 and 2. In all the soft magnetic alloy powders, an average particle size of the soft magnetic alloy particles was 25 μm.

Further, the obtained soft magnetic alloy powder was subjected to heat treatment. Heat treatment conditions in experimental examples shown in Table 1 are shown in Table 1. Heat treatment conditions in experimental examples shown in Table 2 were appropriately controlled within a range of a holding temperature of 800° C. or more and 1100° C. or less, a holding time of 10 minutes or more and 3 hours or less, and a cooling rate to 300° C. after the heat treatment of 0.1° C./s or more and 100° C./s or less.

[Preparation of Dust Core]

An epoxy resin as a binder was added to the soft magnetic alloy powder after the heat treatment to prepare a granulated powder. A type and an amount of the epoxy resin were appropriately determined according to a composition of each soft magnetic alloy powder. The granulated powder was molded into a toroidal shape having an outer diameter of 18 mm, an inner diameter of 10 mm, and a height of 5 mm at a molding pressure of 6 ton/cm$^2$. Next, a green compact was held at 180° C. for 3 hours in an air atmosphere to cure the resin, thereby obtaining a dust core having a toroidal shape.

[Evaluation of Soft Magnetic Alloy Powder]

(Evaluation of Magnetic Properties)

Saturation magnetization σs and coercivity Hc of the soft magnetic alloy powder of each experimental example were measured. The σs was measured with a vibrating sample magnetometer (VSM) at a magnetic field of 1000 kA/m. The Hc was measured with an Hc meter. Results are shown in Tables 1 and 2. The σs of 120 emu/g or more was evaluated as good, and the σs of 140 emu/g or more was evaluated as better. The He of 1000 A/m or less was evaluated as good, and the He of 800 A/m or less was evaluated as better.

(Observation of Si Segregation Part)

Whether Si segregation parts were present in crystal grain boundaries and crystal grains was specified by observing a cross section obtained by polishing a cross section of a compound obtained by kneading the soft magnetic alloy powder with a resin. Specifically, positions of the crystal grain boundaries and the crystal grains in the soft magnetic alloy particles were specified from a COMPO image obtained by observing the compound at a magnification of 2000 times using an EPMA (JXA-8500F manufactured by JEOL Ltd.). Then, from a Si mapping image obtained by observing the compound at the magnification of 2000 times using the EPMA (JXA-8500F manufactured by JEOL Ltd.), it was specified whether the Si segregation parts were present in the crystal grain boundaries in the soft magnetic alloy particles, and whether the Si segregation parts were present in the crystal grains in the soft magnetic alloy particles.

Measurement conditions of the EPMA were an acceleration voltage of 15.0 kV, an irradiation current of $1.030\times10^{-7}$ A, an irradiation time of 40.00 ms, the number of measurement points of 200×200, and a measurement point interval of 0.20 μm. An amount of Si is calculated assuming that a total amount of four elements of Si, P, O, and Fe is 100 mass %. P and O are contained as inevitable impurities. Compositions of parts other than the soft magnetic alloy particles are inaccurate. This is because the parts other than the soft magnetic alloy particles contain a large amount of carbon (C) derived from the kneaded resin.

In this example, at least 10 soft magnetic alloy particles were observed in a cross section obtained by polishing a cross section of a compound obtained by kneading the soft magnetic alloy particles with a resin. In each example, a ratio of soft magnetic alloy particles having Si segregation parts present both in the crystal grain boundaries and in the crystal grains was 70% or more on the basis of the number. In contrast, in a comparative example of Sample No. 1, no Si segregation part was observed in the crystal grain boundaries and in the crystal grains. Further, in a comparative example of Sample No. 2, the ratio of the soft magnetic alloy particles having the Si segregation parts present in the crystal grain boundaries was 70% or more on the basis of the number, but the soft magnetic alloy particles having the Si segregation parts present in the crystal grains were not confirmed. Results are shown in Tables 1 and 2.

[Evaluation of Dust Core] (Measurement of Permeability and DC Superimposition Characteristics) Relative permeability μ' at a frequency of 1 MHz was measured for the dust core of each of examples and comparative examples. An RF impedance analyzer (4991A manufactured by Agilent Technologies, Inc.) was used to measure the relative permeability μ'. Further, the DC superimposition characteristics were evaluated by calculating $\mu_{20k}/\mu_0$, where $\mu_0$ was the relative permeability μ' when an applied direct current was 0, that is, a direct current was not superimposed, and $\mu_{20k}$ was the relative permeability μ' when a direct current magnetic field of 20 kA/m was applied by superimposing a direct current. In this example, $\mu_0$ of 22.0 or more was evaluated as good, and $\mu_0$ of 23.0 or more was evaluated as better. Further, $\mu_{20k}/\mu_0$ of 0.55 or more was evaluated as good, and $\mu_{20k}/\mu_0$ of 0.60 or more was evaluated as better. Results are shown in Tables 1 and 2.

(Measurement of Core Loss (Power Loss) Pcv)

The dust core of each of examples and comparative examples was wound 30 times with a primary winding and 10 times with a secondary winding. Then, Pcv was measured at a measurement frequency of 0.3 MHz and a magnetic flux density of 25 mT. Further, Pcv was measured at a measurement frequency of 3 MHz and a magnetic flux density of 10 mT. Pcv was measured using a B-H analyzer (SY-8218 manufactured by Iwasaki Electric Co., Ltd.). Pcv measured at the measurement frequency of 0.3 MHz and the magnetic flux density of 25 mT was evaluated as good when Pcv was 600 kW/m$^3$ or less, and was evaluated as better when Pcv was 500 kW/m$^3$ or less. Pcv measured at the measurement frequency of 3 MHz and the magnetic flux density of 10 mT was evaluated as good when Pcv was 2200 kW/m$^3$ or less, and was evaluated as better when Pcv was 2000 kW/m$^3$ or less. Results are shown in Tables 1 and 2.

TABLE 1

| | | | Heat Treatment Conditions | | | Si Segregation Part | | Soft Magnetic Alloy Powder | | Dust Core | | | | |
|---|---|---|---|---|---|---|---|---|---|---|---|---|---|---|
| | | | | | | | | Saturation | | | | | Core Loss | |
| | | | | | | | | | | Relative Permeability | | | Pcv [kW/m$^3$] | |
| Sample No. | Examples/ Comparative Examples | Si Amount [mass %] | Holding Temperature [° C.] | Holding Time [min.] | Cooling Rate [° C./s] | Crystal Grain Boundary | Crystal Grain | Magnetization σs [emu/g] | Coercivity Hc [A/m] | μ' $\mu_0$ | $\mu_{20k}$ | $\mu_{20k}/\mu_0$ | 0.3 MHz 25 mT | 3 MHz 10 mT |
| 1 | Comparative Example | 4.5 | 810 | 10 | 1000 | Absent | Absent | 197 | 516 | 25.0 | 17.9 | 0.71 | 362 | 2813 |
| 2 | Comparative Example | 4.5 | 810 | 10 | 0.01 | Present | Absent | 196 | 548 | 24.7 | 17.9 | 0.72 | 367 | 2391 |
| 3 | Example | 4.5 | 810 | 10 | 0.2 | Present | Present | 202 | 540 | 24.5 | 17.8 | 0.72 | 372 | 1406 |

TABLE 2

| | | | Si Segregation Part | | Soft Magnetic | | Dust Core | | | | |
|---|---|---|---|---|---|---|---|---|---|---|---|
| | | | | | Saturation | | Relative Permeability | | | Core Loss Pcv [kW/m$^3$] | |
| Sample No. | Examples/ Comparative Examples | Si Amount [mass %] | Crystal Grain Boundary | Crystal Grain | Magnetization σs [emu/g] | Coercivity Hc [A/m] | μ' $\mu_0$ | $\mu_{20k}$ | $\mu_{20k}/\mu_0$ | 0.3 MHz 25 mT | 3 MHz 10 mT |
| 4 | Example | 2.0 | Present | Present | 210 | 808 | 24.7 | 17.8 | 0.72 | 543 | 2093 |
| 5 | Example | 3.0 | Present | Present | 207 | 642 | 24.7 | 17.8 | 0.72 | 451 | 1802 |

TABLE 2-continued

| Sample No. | Examples/ Comparative Examples | Si Amount [mass %] | Si Segregation Part: Crystal Grain Boundary | Si Segregation Part: Crystal Grain | Soft Magnetic: Saturation Magnetization σs [emu/g] | Soft Magnetic: Coercivity Hc [A/m] | Dust Core: Relative Permeability μ': $\mu_0$ | Dust Core: Relative Permeability μ': $\mu_{20k}$ | Dust Core: Relative Permeability μ': $\mu_{20k}/\mu_0$ | Dust Core: Core Loss Pcv [kW/m³]: 0.3 MHz 25 mT | Dust Core: Core Loss Pcv [kW/m³]: 3 MHz 10 mT |
|---|---|---|---|---|---|---|---|---|---|---|---|
| 3 | Example | 4.5 | Present | Present | 202 | 540 | 24.5 | 17.8 | 0.72 | 372 | 1406 |
| 6 | Example | 6.5 | Present | Present | 195 | 431 | 24.3 | 17.2 | 0.71 | 321 | 1127 |
| 7 | Example | 8.0 | Present | Present | 180 | 261 | 24.0 | 16.5 | 0.69 | 284 | 826 |
| 8 | Example | 10.0 | Present | Present | 162 | 205 | 23.5 | 15.0 | 0.64 | 259 | 680 |
| 8a | Example | 11.0 | Present | Present | 151 | 207 | 23.2 | 14.1 | 0.61 | 248 | 618 |
| 9 | Example | 12.0 | Present | Present | 139 | 242 | 22.8 | 13.1 | 0.57 | 238 | 567 |

From Tables 1 and 2, the magnetic properties were good in each of examples in which the Si segregation parts are included in the crystal grains of the soft magnetic alloy particles. Further, when the dust core was produced from the soft magnetic alloy particles, good relative permeability and direct current superposition characteristics were exhibited, and the core loss at any frequency was small.

Further, when the amount of Si was 3.0 mass % or more, the coercivity of the soft magnetic alloy powder and the core loss of the dust core were particularly low. When the amount of Si was 11.0 mass % or less, the saturation magnetization of the soft magnetic alloy powder and the relative permeability μ' of the dust core were particularly high. Further, the DC superimposition characteristics of the dust core were improved.

In contrast, in a case where the Si segregation parts are not included in the crystal grains of the soft magnetic alloy particles (Sample Nos. 1 and 2), the core loss at a high frequency deteriorated when the dust core was produced from the soft magnetic alloy particles.

REFERENCE SIGNS LIST

2 soft magnetic alloy particle
**2*a*** (soft magnetic alloy) particle surface
4 crystal grain
**4*a*** crystal grain boundary

What is claimed is:

1. A soft magnetic alloy powder comprising soft magnetic alloy particles, wherein
- the soft magnetic alloy particles consist of Fe, Si, and inevitable impurities,
- an amount of Si in the soft magnetic alloy particles is 3.0 mass % or more and 11.0 mass % or less,
- the soft magnetic alloy particles include crystal grains and a crystal grain boundary between the crystal grains,
- an average particle size of the soft magnetic alloy particles is 1 μm or more and 50 μm or less,
- at least one of the crystal grains has a Si segregation part,
- the Si segregation part is a part having a Si concentration of 105% or more with respect to an average Si concentration of the soft magnetic alloy particles,
- the Si segregation part exists in both the crystal grain boundary and at least one of the crystal grains, and
- a size of one Si segregation part is 0.4 $\mu m^2$ or more.

2. A dust core comprising the soft magnetic alloy powder according to claim 1.

3. A coil component comprising the dust core according to claim 2.

4. The soft magnetic alloy powder according to claim 1, wherein Ni is contained in an amount of 5.0 mass % or less.

5. The soft magnetic alloy powder according to claim 1, wherein Ni is contained in an amount of 0.5 mass % or less.

6. The soft magnetic alloy powder according to claim 1, wherein a total amount of the inevitable impurities is 2.0 mass % or less.

7. The soft magnetic alloy powder according to claim 1, wherein a total amount of the inevitable impurities is 1.0 mass % or less.

8. The soft magnetic alloy powder according to claim 1, wherein the Si segregation part is present in a net-like structure in the crystal grain.

9. The soft magnetic alloy powder according to claim 1, wherein a total area of the Si segregation parts in the crystal grains is 5% or more of the total area of the crystal grains.

10. The soft magnetic alloy powder according to claim 1, wherein a content ratio of the soft magnetic alloy particles including the Si segregation parts in the crystal grains is 50% or more based on the number of particles.

11. A soft magnetic alloy powder comprising soft magnetic particles, wherein
- the soft magnetic alloy particles consist of Fe, Si, and inevitable impurities,
- an amount of Si in the soft magnetic alloy particles is 3.0 mass % or more and 11.0 mass % or less,
- the soft magnetic alloy particles include crystal grains and a crystal grain boundary between the crystal grains,
- an average crystal grain size of the soft magnetic alloy particles is 0.5 μm or more and 20 μm or less,
- at least one of the crystal grains has a Si segregation part,
- the Si segregation part is a part having a Si concentration of 105% or more with respect to an average Si concentration of the soft magnetic alloy particles,
- the Si segregation part exists in both the crystal grain boundary and at least one of the crystal grains, and
- a size of one Si segregation part is 0.4 $\mu m^2$ or more.

12. A dust core comprising the soft magnetic alloy powder according to claim 11.

13. A coil component comprising the dust core according to claim 12.

14. The soft magnetic alloy powder according to claim 11, wherein Ni is contained in an amount of 5.0 mass % or less.

15. The soft magnetic alloy powder according to claim 11, wherein Ni is contained in an amount of 0.5 mass % or less.

16. The soft magnetic alloy powder according to claim 11, wherein a total amount of the inevitable impurities is 2.0 mass % or less.

17. The soft magnetic alloy powder according to claim 11, wherein a total amount of the inevitable impurities is 1.0 mass % or less.

18. The soft magnetic alloy powder according to claim 11, wherein the Si segregation part is present in a net-like structure in the crystal grain.

19. The soft magnetic alloy powder according to claim 11, wherein a total area of the Si segregation parts in the crystal grains is 5% or more of the total area of the crystal grains.

20. The soft magnetic alloy powder according to claim 11, wherein a content ratio of the soft magnetic alloy particles including the Si segregation parts in the crystal grains is 50% or more based on the number of particles.

* * * * *